(12) United States Patent
Doll et al.

(10) Patent No.: US 6,814,426 B2
(45) Date of Patent: Nov. 9, 2004

(54) COLOR INK-JET PRINTER WITH DYE-BASED BLACK AND PIGMENT-BASED COLOR INK

(75) Inventors: Paul F. Doll, East Providence, RI (US); Donald Dressler, Glastonbury, CT (US); Sean Kelly, Brookline, NH (US)

(73) Assignee: American Ink Jet Corp., Billerica, MA (US)

( * ) Notice: Subject to any disclaimer, the term of this patent is extended or adjusted under 35 U.S.C. 154(b) by 0 days.

(21) Appl. No.: 10/184,204

(22) Filed: Jun. 28, 2002

(65) Prior Publication Data

US 2003/0030695 A1 Feb. 13, 2003

Related U.S. Application Data

(60) Provisional application No. 60/302,003, filed on Jun. 29, 2001, and provisional application No. 60/302,737, filed on Jul. 3, 2001.

(51) Int. Cl.[7] .................................................. B41J 2/21
(52) U.S. Cl. .......................................................... 347/43
(58) Field of Search .......................... 347/40, 43, 100; 106/31.13

(56) References Cited

U.S. PATENT DOCUMENTS

| | | | |
|---|---|---|---|
| 5,023,129 A | 6/1991 | Morganti et al. | 428/195 |
| 5,085,698 A | 2/1992 | Ma et al. | 106/20 |
| 5,254,160 A | 10/1993 | Beach et al. | 106/22 K |
| 5,679,139 A | 10/1997 | McInerney et al. | 106/20 D |
| 5,725,641 A | 3/1998 | MacLeod | 106/31.5 |
| 5,738,716 A | 4/1998 | Santilli et al. | 106/31.77 |
| 5,745,140 A | 4/1998 | Stoffel et al. | 347/100 |
| 5,858,075 A | 1/1999 | Deardurff et al. | 106/31.27 |
| 6,113,677 A | 9/2000 | Kaufmann | 106/31.27 |
| 6,152,999 A | 11/2000 | Erdtmann et al. | 106/31.6 |
| 6,153,000 A | 11/2000 | Erdtmann et al. | 106/31.6 |
| 6,168,654 B1 | 1/2001 | Nohr et al. | 106/31.49 |
| 6,168,655 B1 | 1/2001 | Nohr et al. | 106/31.58 |
| 6,467,896 B2 * | 10/2002 | Meyer et al. | 347/101 |
| 6,488,751 B1 * | 12/2002 | Takemoto | 106/31.13 |

* cited by examiner

Primary Examiner—Stephen D. Meier
Assistant Examiner—An H. Do
(74) Attorney, Agent, or Firm—Foley Hoag LLP

(57) ABSTRACT

A color ink-jet printer is provided, with one pen for dispensing black ink onto a print medium and at least one pen for dispensing color ink onto a print medium. The pen for dispensing black ink contains a fade resistant dye-based ink and the pen(s) for dispensing color ink(s) contain a pigment-based ink(s). Such a color ink-jet printer provides both superior color gamut with contrast and excellent fade resistance. Since the black ink does not need to be chromatic one can employ fade resistant dyes that do not decrease the lightfastness of the whole ink set. In addition, very soluble fade resistant dyes can be used reliably in high concentrations allowing the black ink to provide more optical density than current pigment-based black inks.

8 Claims, 1 Drawing Sheet

COLOR INK-JET PRINTER WITH DYE-BASED BLACK AND PIGMENT-BASED COLOR INK

REFERENCE TO RELATED APPLICATION

This application claims the benefit of and incorporates by reference U.S. Application Ser. No. 60/302,003 filed Jun. 29, 2001 and U.S. Application Ser. No. 60/302,737 filed Jul. 3, 2001.

FIELD OF THE INVENTION

The present invention relates generally to ink-jet printers, and, more particularly, to color ink-jet printers.

BACKGROUND OF THE INVENTION

Ink-jet printers capable of forming color images using an ink set derived from cyan, yellow, magenta, and black inks are now commercially available. Ink-jet printers also are known to use additional, less concentrated cyan and magenta inks to smooth out tonal gradations. Specific types of ink-jet printers, such as thermal and piezoelectric, are also well-known.

U.S. Pat. No. 5,738,716 discloses 4-color pigment-based ink jet inks which exhibit color gamuts suitable for pictorial imaging with lightfastness. However these pigment-based ink sets are known to yield pale looking images when printed on absorbent media, such as fine art water color paper. Ink receiving coatings have been applied to enhance the color (U.S. Pat. No. 5,023,129), but the contrast of the image remains unacceptably low for high end pictorial imaging due to the lack of deep rich blacks.

Dye-based inks can be formulated which also exhibit improved lightfastness See for example U.S. Pats. Nos. 5,254,160; 5,725,641; 5,858,075; 6,113,677; 6,168,654; and 6,168,655. A well understood technique, by those skilled in the art, to improve dye-based inks' lightfastness is to metalize the dye. But this results in less chromatic inks which makes it an undesirable solution for color inks such as cyan, magenta, yellow, red, green, and blue.

Thus, an object of the present invention is to provide an ink set that produces acceptably high contrast and high gamut pictorial images which are lightfast.

SUMMARY OF THE INVENTION

Figure 1:
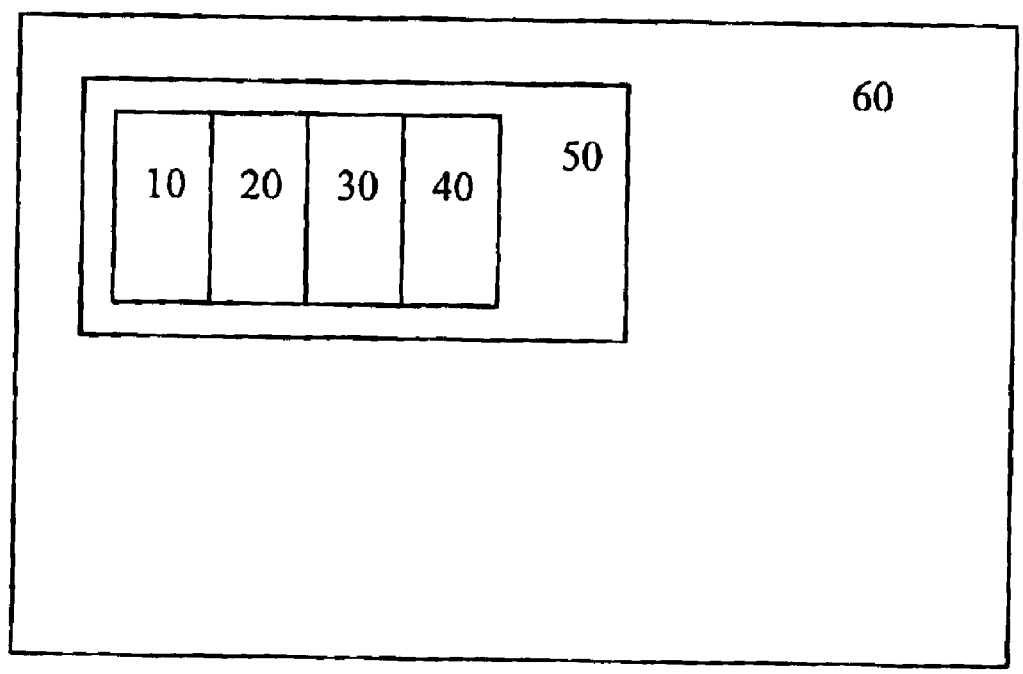
FIG. 1 shows a schematic representation of an ink jet printer in accordance with the present invention.

In accordance with the present invention, a color ink-jet printer is provided with one print cartridge for dispensing black ink onto a print medium and at least one print cartridge for dispensing color ink onto a print medium. The cartridge for dispensing black ink contains at least one water-miscible dye in a dye-based ink, and each cartridge for dispensing a color ink each contains at least one pigment dispersed in a pigment-based ink. Such a color ink-jet printer provides a superior saturated color gamut, which also has excellent contrast, and is capable of producing images with excellent fade resistance, by combining at least one dye-based ink with at least one pigment-based ink. In one embodiment, only one dye-based ink is combined with at least one pigment-based ink.

Lack of chromaticity is not a problem with a black ink; thus, one may use suitable methods to metalize the dye in this invention. Following is a list of dyes which fall under the scope of this invention, but these do not define the limits of this invention: Reactive Black 8, 9, 11, 12, 13, 15, 22, 24, 25, 28, 31. Other methods of for improving the lightfastness of ink jet inks are known such as promoting aggregation of the dye molecules and/or addition of ultraviolet blockers, antioxidants, Hindered Amine Light Stabilizers (HALS), and/or inclusion chemicals such as cyclodextrins. These methodologies may be used alone or in combinations of one or more. Additionally these dyes may be used alone or in combination.

DETAILED DESCRIPTION

For the sake of convenience, certain terms appearing throughout this document are collected here and defined. As used herein, color ink refers to an ink that is not black. The term "vehicle" refers to a carrier such as a fluid or a liquid such as those known in the art. A preferred vehicle is capable of providing an ink in which a dye is dissolved or a pigment is dispersed. In certain embodiments, the vehicle can provide a small particle size and/or be quick drying. As used herein, "medium" refers to a substance capable of receiving ink from an inkjet printer to display an image. Preferred mediums include paper, newsprint, glossy or matte finished card stock and the like.

Print contrast is a measure of the ability of the printing process to hold shadow detail. A density measurement can be taken of a three-quarter tone patch and of a solid patch. Print contrast can be expressed as the percentage ratio of the difference in density between the two patches and the solid ink. A value above 30% is generally considered acceptable. The fade resistance of an ink is a measure of the chemical breakdown of the ink upon exposure to sunlight for prolonged periods of time.

An ink jet printer employing cyan, magenta, yellow, and black inks (CMYK) is capable of printing high quality pictorial images. Together, these four colors provide a wide palette of colors, tints, and hues. It is also understood by those skilled in the art that other colors may further expand the range of printable colors, such as red, green, blue, and violet. In addition low-density versions of all or certain colors may make tonal gradations smoother. For example, FIG. 1 shows an ink jet printer 60 with a cartridge 50 with pens 10, 20, 30, and 40.

The printer may be based on a known thermal jetting action, employing a plurality of ink firing chambers, each containing a resistor element that, upon energizing, forms a bubble of ink that is expelled through a nozzle toward the print medium. Alternatively, the print cartridge may be based on a known piezoelectric jetting action, employing a plurality of ink firing chambers, each containing a piezoelectric element that, upon energizing, expels a quantity of ink through a nozzle toward the print medium. Both thermal and piezoelectric print cartridges are well known in the art of ink-jet printing.

Cartridges suitable for the practice of the present invention may comprise a variety of configurations. In certain embodiments, a cartridge may comprise two, three, four separate cartridges, or up to twelve print cartridges or more, each containing a different ink. As used herein, the term "cartridge" can describe either separate pens (in which case, pen and cartridge are synonymous) or a monolithic pen containing multiple cartridges. In the latter case, the cartridges may be individually replaceable or tube-fed with ink from an off-axis ink supply.

In accordance with one feature of the present invention, the black ink is dye-based containing at least one dye, while each color ink contains at least one dispersed pigment. The particular pigments and dispersants employed for the color inks in the practice of the present invention are those commonly employed in ink-jet printing. While the printed color of these inks is known to be less chromatic than dye-based inks (See Table 1 below), they are known to provide superior lightfastness and at the same to provide satisfactory colors (See Table 2)

The black ink can have improved lightfastness by using techniques for colorfast inks that reduce chromaticity, because chromaticity is not significant for black ink jet inks. Thus a black ink jet ink can be realized which has greater lightfastness than that of most colored pigmented inks (See FIG. 2). Additionally some of these dyes can be formulated into reliable inks even at high concentrations which allows them to provide very high optical densities even on absorbent media. A densitomer or spectradensitometer can be used to measure density which is calculated as log of the inverse of the transmittance of the material.

In one instance, a reflection densitometer can measure the amount of light reflected from a surface. Certain conditions have been defined by the American National Standards Institute (ANSI) and by the International Standards Organization (ISO) which are helpful to determine optical density. These specifications deal with the geometric conditions of measurement and with the spectral responses of the instruments. A reflection densitometer has a light source that has a stable output, optics to focus the light into a defined light spot on the sample, filters to define the spectral response of the unit and a detector to monitor the reflected light. The sample can be illuminated from above, i.e. at 90° to the sample surface, and viewed at 45° to the surface. This viewing condition may be reversed if required. This viewing condition eliminates gloss reflections and only the diffuse reflections are seen by the detector. Hence this invention allows for an ink set which has lightfastness comparable to commercial pigmented ink sets and also is capable of printing a larger color gamut (See FIG. 1).

The use of dye-based black ink in combination with at three to five color inks containing one or more dispersed pigments, in accordance with the invention, is expected to be advantageous in thermal and piezo ink-jet printers.

Table 1 shows the color gamut volumes of three inks sets. The gamut volumes are calculated from CIELAB color space of prints made using an Epson Stylus 9000 (Seiko Epson Corporation, Tokyo JP) printer on Roland PQM-CRBW media (Roland DGA Corp., Irvine Calif.). The ink sets shown are (1) a commercially available pigment set that comes with the printer used, (2) a commercially available dye-based set, Pinnacle Gold, with good lightfastness (American Ink Jet Corporation, Billerica Mass.), and (3) the pigmented cyan, magenta, yellow, light cyan, and light magenta inks from set 1 with a dye-based black ink (Reactive Black 8 in this instance), a set in accordance with the invention.

TABLE 1

Color Space Volumes

| Ink Set | Pigment-based | Dye-based | Pigment-based colors + Dye-based Black |
|---|---|---|---|
| Volume | 781,685 | 983,875 | 799,025 |

Table 2 shows the lightfastness of the same three ink sets from Table 1. The lightfastness is determined by fading the prints made using a Roland FJ-50 printer on Roland PQM-CRBW media. Prints containing cyan, magenta, yellow, black, red, green, blue, and process black (cyan, magenta, & yellow) were faded using an Atlas Ci3000 Weatherometer. The life of the ink set is defined by the first color to reach a Delta E greater than 10, where Delta E is defined by the colors' shift in CIELAB space ($\Delta E=((L-L)+(a-a)+(b-b))$ 0.5). In a preferred embodiment, an ink of the invention will have an excellent fade resistance. An ink with an excellent fade resistance can maintain $\Delta E$ less than 10 while withstanding the following exposure:

(1) exposure to fluorescent light equal to 197,100,000 lux*hrs and (2) exposure to Xenon Arc lamp equal to 300 hrs at irradiance of 0.61W/m2 (at 340 nm). Thus an ink set is only as strong as its weakest color.

TABLE 2

Lightfastness

| Ink Set | Pigment-based | Dye-based | Pigment-based colors + Dye-based Black |
|---|---|---|---|
| Hours of exposure (Failed Color) | 201 (Yellow) | 16 (Yellow) | 201 (Yellow) |

Accordingly, the inks of the present invention can be used to print images having a saturated color gamut which also has an excellent contrast and to produce an inkjet ink set capable of producing images with excellent fade resistance.

References Cited

All references (including issued patents, patent publications and articles) cited throughout this document are hereby incorporated in their entireties.

U.S. Pat. No. 5,085,698 issued to Dupont for "Acqueous Pigmented Inks for Ink Jet Printers"

U.S. Pat. No. 5,023,129 issued to Dupont for "Element as a Receptor for Non Impact Printing"

U.S. Pat. No. 5,679,139 issued to Kodak for "Cyan and Magenta Pigment Set"

U.S. Pat. No. 5,725,641 issued to MacLeod for "Lightfast Inks for Ink-Jet Printing"

U.S. Pat. No. 5,725,647 issued to 3M for "Pigmented Inks and Humectants Used Therewith"

U.S. Pat. No. 5,858,075 issued to Hewlett Packard for "Dye Set for Improved Ink-Jet Image Quality"

U.S. Pat. No. 5,745,140 issued to HP for "Color Ink-Jet Printer with Pigment Black and Dye-Based Color Inks"

U.S. Pat. No. 6,113,677 issued to Kaufmann for "Coloring Agent"

U.S. Pat. No. 5,738,716 issued to Kodak for "Color Pigmented Ink Jet Ink Set"

U.S. Pat. No. 5,254,160 issued to Lexmark for "Magenta Dye, Jet Ink, and Color Set"

U.S. Pat. No. 6,153,000 issued to Kodak for "Color Pigmented Ink Jet Set"

U.S. Pat. No. 6,168,654 issued to Kimberly Clarke for "Colorant Stabilizers"

U.S. Pat. No. 6,152,999 issued to Kodak for "Color Pigmented Ink Jet Set"

U.S. Pat. No. 6,168,655 issued to Kimberly Clarke for "Colorant Stabilizers"

Thus, there has been disclosed a color inkjet printer with dye-based black and pigment-based color inks. It will be readily apparent to those skilled in this art that various changes and modifications of an obvious nature may be made, and all such changes and modifications are considered to fall within the scope of the present invention, as defined by the appended claims.

What is claimed is:

1. A color ink-jet printer employing a selected combination of pigment-based and dye-based inks in an ink-jet ink set, said color ink-jet printer including
    at least one print cartridge for dispensing black ink onto a print medium and
    at least one print cartridge for dispensing color ink onto a print medium such that a printed image is formed on said print medium by said black ink and said color ink,
    said black ink and said color ink together representing an ink-jet ink set,
    said print cartridge for dispensing black ink comprising only a dye-based ink,
    said dye-based ink comprising a vehicle and at least one water miscible dye-based colorant therein, and
    said at least one print cartridge for dispensing color ink comprising a pigment-based ink,
    said pigment-based ink including a vehicle and at least one pigmented colorant dispersed therein,
    said ink-jet ink set employed in said color ink-jet printer wherein said ink-jet ink set is capable of producing images with
        a saturated color gamut which also has contrast, and fade resistance.

2. The color ink-jet printer of claim 1 including at least four print cartridges for dispensing color, with one print cartridge adapted to dispense cyan ink, a second print cartridge adapted to dispense yellow ink, a third print cartridge adapted to dispense magenta ink, a forth print cartridge adapted to dispensing the black ink.

3. The color ink-jet printer of claim 1 including at least six print cartridges for dispensing color, with one print cartridge adapted to dispense cyan ink, a second print cartridge adapted to dispense yellow ink, a third print cartridge adapted to dispense magenta ink, a forth print cartridge adapted to dispensing a light cyan ink, a fifth print cartridge adapted to dispensing a light magenta ink, and a sixth print cartridge adapted to dispensing the black ink.

4. The color ink-jet printer of claim 1 including at least six print cartridges for dispensing color, with one print cartridge adapted to dispense cyan ink, a second print cartridge adapted to dispense yellow ink, a third print cartridge adapted to dispense magenta ink, a forth print cartridge adapted to dispensing a green ink, a fifth print cartridge adapted to dispensing an orange ink, and a sixth print cartridge adapted to dispensing the black ink.

5. The color ink-jet printer of claim 1 wherein all color inks each contain at least one dispersed pigment.

6. The color ink-jet printer of claim 1 wherein the black ink contains at least one water miscible dye.

7. A method for jetting an ink onto a medium using a color ink-jet printer having a selected combination of pigment-based and dye based inks in an ink-jet set, said method comprising the steps of:
    providing at least one print cartridge for dispensing black ink onto a print medium wherein said print cartridge for dispensing black ink comprises only a dye-based ink and said dye-based ink comprises a vehicle and at least one water miscible dye-based colorant therein,
    providing at least one print cartridge for dispensing color ink comprising a pigment-based ink, said pigment-based ink including a vehicle and at least one pigmented colorant dispersed therein, wherein said black ink and said color ink together representing an ink-jet ink set,
    jetting a combination of inks onto a print medium such that a printed image is formed on said print medium by said black ink and said color ink, wherein said ink-jet ink set is capable of producing images with
        a saturated color gamut which also has contrast, and fade resistance.

8. The method of claim 7, wherein the print medium is heated.

* * * * *